US005859374A

United States Patent [19]

Mink et al.

[11] Patent Number: 5,859,374

[45] Date of Patent: Jan. 12, 1999

[54] FLEXIBLE CENTRIFUGE TUBE HAVING BIO-CONTAINMENT FUNCTION

[75] Inventors: Ronald William Mink, West Linn; Andrew Sherman Goldstein, Portland, both of Oreg.

[73] Assignee: Epitope, Inc., Beaverton, Oreg.

[21] Appl. No.: 886,562

[22] Filed: Jul. 1, 1997

[51] Int. Cl.[6] .................. G01N 1/00

[52] U.S. Cl. .................. 73/863; 422/72

[58] Field of Search .................. 73/863; 422/72, 422/101, 99; 494/72

*Primary Examiner*—Robert Raevis

*Attorney, Agent, or Firm*—Townsend and Townsend and Crew

[57] ABSTRACT

An apparatus and process for transporting and discharging biohazardous materials is disclosed. A vial is provided having an interior for receiving biohazardous contents. The vial is sealed at one end by a frangible tip for forming an opening in the vial upon breaking of the frangible tip. The vial includes a cap at the opposite end of the vial for sealing the vial when a biohazardous sample contained in a porous absorbent member is placed interior of the vial. A centrifuge tube is provided with an upper opening having a dimension to be plugged when the vial is placed into the centrifuge tube. The centrifuge tube has flexible sidewalls to permit digital manipulation of the frangible tip of the vial by the sidewalls of the centrifuge tube. The vial is placed within the centrifuge tube to plug the tube. Once the vial is within the tube, the tube is digitally manipulated to break the frangible tip of the vial by compressing sidewalls of the centrifuge tube to break the frangible tip of the vial interior of the centrifuge tube. Thereafter, centrifuging the centrifuge tube and vial with broken frangible tip occurs. This causes the biohazardous material to discharge from the porous absorbent member and vial into the centrifuge tube for further processing.

3 Claims, 2 Drawing Sheets

FLEXIBLE CENTRIFUGE TUBE HAVING BIO-CONTAINMENT FUNCTION

A flexible centrifuge tube is utilized as a bio-containment cap permitting unsealing of bio-hazardous materials without endangering laboratory personnel. The tube thereafter is processed in a centrifuge and thus later receives and contains the bio-hazardous material.

BACKGROUND OF THE INVENTION

The Epitope® Orasure® or Episcreen™ oral collection device is a commercially available product manufactured by the Epitope Corporation of Beaverton, Oregon. This is a collection device sealed by a cap at one end and having a frangible tip at the opposite end. Specimens are collected and preserved from the mouth of individuals for the analysis and diagnosis of disease, including HIV, hepatitis A, B, and C, and h. pylon, etc. Additionally, the test can detect the presence of metabolites such as cotinine or by products of drug use. Consequently, a potential biohazard is present.

Briefly stated, these devices are used in a process for collecting substances for testing, such as oral mucosal transudate (OMT) from a location in the mouth between the cheek and gum. The collection device comprises a porous absorbent member placed within a collection vial. The collection vial contains a sample preservative enclosed by a removable closure member, and a second closed end with frangible tip.

In use, the porous absorbent member collects oral fluid, which can constitute the biohazardous material. Utilizing a variety of steps, the absorbent member is inserted into the vial. Mixing of the absorbent member with preservative located in the vial occurs. The sealed vial, and saturated porous absorbent member is then shipped to a lab.

In the prior art, and at the lab, the sealed vial is inverted. The frangible tip is then broken off. A centrifuge tube is then placed over the outside of the vial. The sample tube and centrifuge tube are both inverted and centrifuged. During centrifugation, the preserved sample is separated from the porous member and the vial with the broken frangible tip. The pad and closure member are then removed and discarded, and the separated preserved sample is further analyzed.

This procedure has a possible biohazard. During the breaking of the frangible tip, exposure to the biohazard material is possible. First, direct skin contact is possible—where for example protective gloves rupture. Second, during breaking of the tip, an aerosol can form and be inhaled. In either case, an unacceptable biohazard condition results.

SUMMARY OF THE INVENTION

An apparatus and process for transporting and discharging biohazardous materials is disclosed. A vial is provided having an interior for receiving biohazardous contents. The vial is sealed at one end by a frangible tip for forming an opening in the vial upon breaking of the frangible tip. The vial includes a cap at the opposite end of the vial for sealing the vial when a biohazardous sample contained in a porous absorbent member is placed interior of the vial. A centrifuge tube is provided with an upper opening having a dimension to be plugged when the vial is at least partially placed into the centrifuge tube. The centrifuge tube has flexible sidewalls to permit digital manipulation of the frangible tip of the vial by momentarily bending the sidewalls of the centrifuge tube. The vial is placed within the centrifuge tube to plug the tube. Once the vial is within the tube, the tube is digitally manipulated to break the frangible tip of the vial by bending the sidewalls of the centrifuge tube to break the frangible tip of the vial interior of the centrifuge tube. Thereafter, centrifuging the centrifuge tube and vial with broken frangible tip occurs. This causes the biohazardous material to discharge from the porous absorbent member and vial into the centrifuge tube for further processing.

DESCRIPTION OF THE PREFERRED EMBODIMENT

Figure 1:
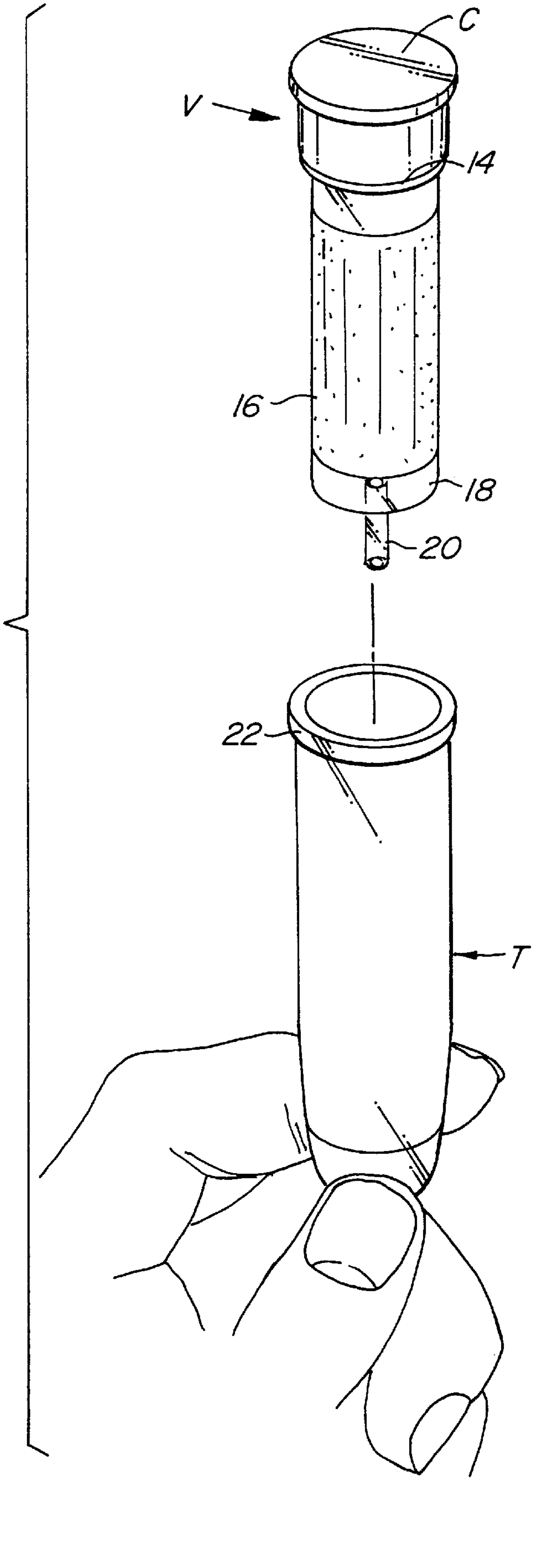
FIG. 1 is a perspective view of a vial containing a bio-hazardous sample placed within a vial having a frangible break off tip, the vial being shown overlying a centrifuge tube for ultimately receiving the biohazardous sample.

Referring to FIG. 1, sealed and labelled vial V is shown overlying flexible centrifuge tube T. Sealed vial V includes cap C with enlarged stopper portion 14. Vial body 16 extends below cap C and receives the biohazardous material. The lower end of vial body 16 includes vial bottom 18 with frangible tip 20. In the prior art, sealed vial V was inverted, frangible tip 20 broken away, and a centrifuge tube inserted over sealed vial V at broken frangible tip 20. For reasons set forth earlier—including the possibility of aerosol, this was unsatisfactory.

The present disclosure includes flexible centrifuge tube T. Flexible centrifuge tube T includes tube top 22 having a dimension to receive cap C at enlarged stopper portion 14. Flexible centrifuge tube T has at least bottom centrifuge tube portion 24 made of flexible material. The flexibility is such that momentary tube bending can occur by digits D of hand H. At the same time, this tube has sufficient rigidity to resist collapse during centrifuging. The material here utilized is described as follows:

Technical Description of the Plastic: The tube is manufactured using a low density polyolefin plastomer, ethelene aplha-olefin, a copolymer of ethelene and octene-1. Specific gravity 0.91–0.99, Hardness(Shore A) 90–98, Flexural modulus, Tangent(pst) 14,400(99)–17,600(118).

Tolerances:

a. Internal diameter of the tube as shown on the diagram: 0.594 inches + or − 0.0025 (0.5915–0.5965). Measured with pin gauge.

b. Fill Line (described as the top of the internal line at 0.320 inches from the bottom of the tube) is measured by volume. Pipette colored water is placed within the tube of the pipette. The volume is to be 0.6 ml + or − 0.1 ml (0.5–0.7). Note: The bottom of the line is 0.5 ml but we are not using it as the reference point. Record the amount of liquid required to reach the top of the internal line with the meniscus of the colored water.

Figure 2:
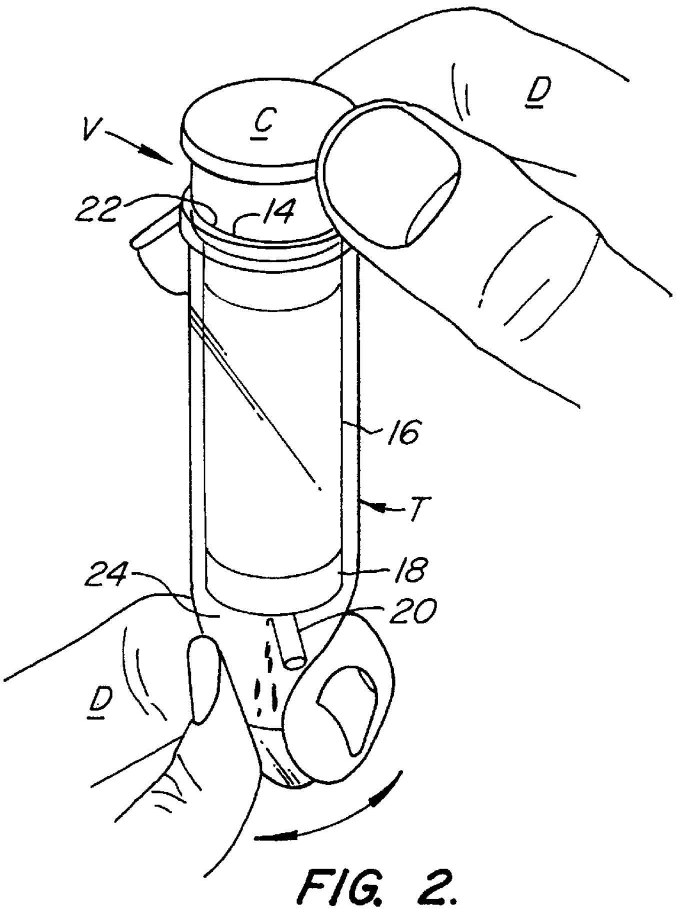
FIG. 2 shows the vial of FIG. 1 at least partially confined within a flexible centrifuge tube with the bottom of the flexible centrifuge tube being grasped and the frangible tip of the sample containing vial being broken away utilizing the centrifuge tube as protective member; and, FIG. 3 illustrates the vial fully seated to the centrifuge tube with centrifuging having already occurred and the sample and preservative having been moved from the vial to the centrifuge tube for further processing, with an adjacent cap which upon removal of the vial and placement of the cap can convert the centrifuge tube into a storage tube for the sample.

Referring to FIG. 2, sealed vial V has been placed interior of flexible centrifuge tube T so that enlarged stopper portion 14 to seal frangible tip 20 within flexible centrifuge tube T. At the same time, digits D collapse the flexible walls of flexible centrifuge tube T and grasp frangible tip 20, causing breaking of the tip relative to vial bottom 18. As a result, the biohazardous sample is liberated to flexible centrifuge tube T.

Figure 3:
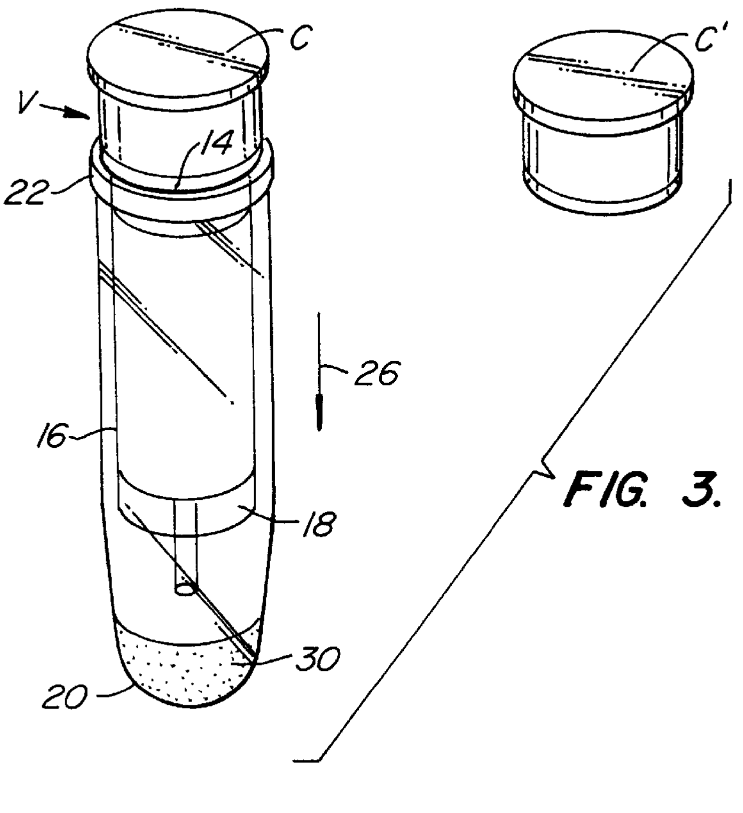

As final step, and referring to FIG. 3, sealed vial V goes into flexible tube T only up to the tip of the vial V. Stopper 14 remains fully outside of tube T during centrifugation (a step schematically represented by arrow 26.) Following centrifugation, biohazardous sample 30 is extracted from the interior of sealed vial V and resides at the bottom of flexible centrifuge tube T. Further processing and or storage can occur.

Regarding such storage, it is within the preview of this invention to have a tube cap C' for placement over the centrifuge tube T upon removal of vial V.

Reading the forgoing, the reader will understand that the prior art step of centrifuging the contents when combined with flexible centrifuge tube T invokes a procedure which is both simplified and safe.

What is claimed is:

1. A centrifuge tube and vial for processing biohazardous materials comprising in combination:

a vial having an interior for receiving biohazardous contents;

a frangible tip sealing one end of the vial for forming an opening in the vial upon breaking of the frangible tip;

a cap at the opposite end of the vial for sealing to the vial when a biohazardous sample is placed interior of the vial;

a centrifuge tube defining an upper opening having a dimension to be plugged when the vial is placed into the centrifuge tube;

the centrifuge tube having flexible sidewalls at least adjacent the bottom of the tube to permit manipulation of the frangible tip of the vial by the digitally compressed sidewall of the centrifuge tube to brake the frangible tip of the vial interior of the centrifuge tube whereby the flexible sidewall of the centrifuge tube comprises a biohazard shield.

2. A process for transporting and discharging biohazardous materials from a vial comprising the steps of:

providing a vial having an interior for receiving biohazardous contents, the vial having a frangible tip at one end of the vial for forming an opening in the vial upon breaking of the frangible tip, and a cap at the opposite end of the vial for sealing to the vial when a biohazardous sample is placed interior of the vial;

placing a biohazardous sample into the interior of the vial and placing the cap to seal the vial;

providing a centrifuge tube defining an upper opening having a dimension to be plugged when the vial is placed into the centrifuge tube, the centrifuge tube having flexible sidewalls;

placing the vial within the centrifuge tube to plug the centrifuge tube;

digitally manipulating the frangible tip of the vial by compressing sidewall of the centrifuge tube to break the frangible tip of the vial interior of the centrifuge tube;

centrifuging the vial with broken frangible tip interior of the centrifuge tube to discharge the biohazardous materials from the vial to the centrifuge tube.

3. A process for transporting and discharging biohazardous materials from a vial according to claim 2 comprising the further steps of:

providing a cap for the centrifuge tube; and, removing the vial and sealing the centrifuge tube with the cap for storing the biohazardous materials.

* * * * *